United States Patent [19]
Gopstein

[11] 3,954,244
[45] May 4, 1976

[54] ADJUSTABLE INSTRUMENT BASE

[75] Inventor: Herbert Gopstein, Wilmington, Del.

[73] Assignees: Washington Nichibei Consultants, Inc., Washington, D.C.; Steven W. Weinrieb, Silver Spring, Md. ; a part interest to each

[22] Filed: Oct. 21, 1974

[21] Appl. No.: 516,830

Related U.S. Application Data

[63] Continuation of Ser. No. 392,506, Aug. 29, 1973, abandoned.

[52] U.S. Cl. ............................ 248/349; 248/11; 248/23
[51] Int. Cl.² ........................................ A47G 23/00
[58] Field of Search ............... 248/1, 310, 346, 349, 248/11, 23, 188.2, 188.9; 16/32, 33, 34; 108/139.1; 403/160

[56] References Cited
UNITED STATES PATENTS

| | | | |
|---|---|---|---|
| 3,021,638 | 2/1962 | Kristek | 248/80.72 |
| 3,452,663 | 7/1969 | Machtig | 248/188.2 |
| 3,486,629 | 12/1969 | Slaga | 211/1.5 |
| 3,595,513 | 7/1971 | Rehlaender | 248/316 |

*Primary Examiner*—Roy D. Frazier
*Assistant Examiner*—Robert W. Gibson, Jr.
*Attorney, Agent, or Firm*—Oblon, Fisher, Spivak, McClelland & Maier

[57] ABSTRACT

An adjustable base for mounting viewing, measuring, or testing instruments thereon, whereby the instrument can be positioned so that its face can be properly viewed at an available line-of-sight regardless of the orientation of the instrument case. The adjustable base consists of an upper part and a lower part defining an oblique plane therebetween wherein the upper part is rotatable relative to the lower part about an axis perpendicular to the oblique plane such that a vertical projection through the center of gravity of the instrument remains within the area of the lower base part. The instrument case is rotatable relative to the upper base part for additional adjustment depending upon the direction of the observer's line-of-sight.

4 Claims, 4 Drawing Figures

ADJUSTABLE INSTRUMENT BASE

This is a continuation of application Ser. No. 392,506, filed Aug. 29, 1973, now abandoned.

BACKGROUND OF THE INVENTION

The present invention relates to an adustable instrument base and, more particularly, to an instrument base which is adjustable so that the reading face of the instrument may be properly viewed regardless of the orientation of the instrument with respect to the eye level of the person reading the instrument.

In prior devices, one means for mounting a measuring, testing or viewing instrument so as to be observable at various positions has been to mount said instrument on an arcuate, upwardly concave wire track. It can be readily appreciated, however, that adjustment of the instrument on these wire tracks to allow viewing at various eye levels requires a translational shifting of the instrument along the wire stand. One problem that can arise as a result of such arrangement is binding, i.e unless the measuring, testing, or viewing instrument is moved properly friction between the slide fittings and the wire stand will cause a temporary obstruction to the translational movement of the instrument. Further, the heavier that the viewing, measuring, or testing instrument becomes, the less convenient and easy it is to shift such instrument along the wire base to achieve the proper viewing position. It is also conceivable that repeated translational shifting along the base might harm more sensitive parts within the instrument over a long period of time.

SUMMARY OF THE INVENTION

It is therefore the aim of the present invention to overcome the problems and disadvantages encountered in prior art devices.

More particularly, it is an object of the present invention to provide an adjustable instrument base whereby adjustment of a measuring, testing or viewing instrument can be accomplished in a quick and simple manner so as to provide direct line-of-sight reading of the instrument face.

It is still a further object of the present invention to provide a sturdy, adjustable instrument base which is relatively compact.

It is still another object of the present invention to provide an adjustable base wherein a vertical projection of the center of gravity of the instrument and base remains within stable limits regardless of the orientation of the instrument.

The foregoing objects have been achieved in accordance with the present invention by providing an adjustable instrument base consisting of upper and lower parts defining an oblique plane therebetween, wherein the upper part is rotatable relative to the lower part and about an offset axis perpendicular to said oblique plane defined by the interface between the upper and lower parts. The instrument case can be provided with the upper part so that the instrument can be rotated relative to the upper base part for additional adjustment. Conventional means, e.g., abutments or clamps, can be employed to maintain the instrument case in its adjusted position.

BRIEF DESCRIPTION OF THE DRAWING

These and other features, objects and advantages of the present invention will become more apparent from the following description when taken in conjunction with the accompanying drawing which shows, for purposes of illustration only, an embodiment in accordance with the present invention and wherein.

DETAILED DESCRIPTION OF A PREFERRED EMBODIMENT

Figure 1:
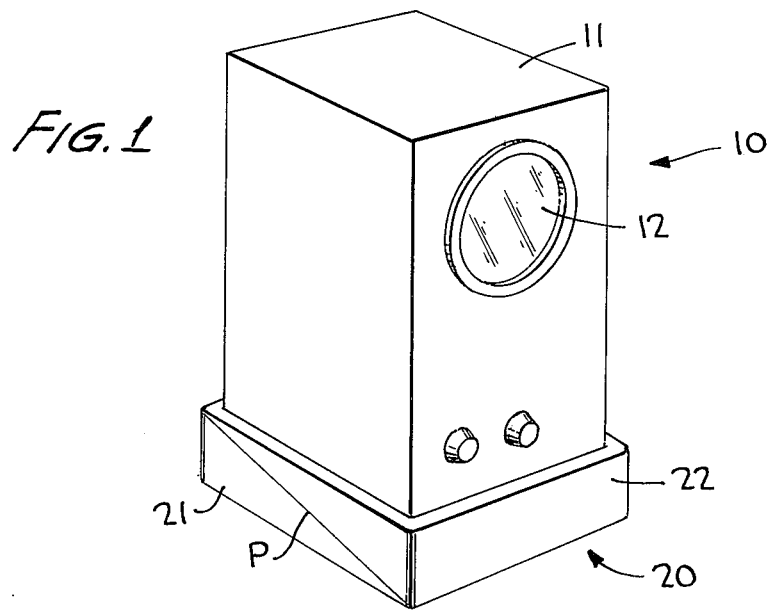
FIG. 1 is an isometric view of one embodiment of the adustable instrument base in accordance with the present invention with a measuring, testing, or viewing instrument mounted thereon for horizontal line-of-sight viewing.

Referring now to the drawing and, in particular, to FIG. 1, there is shown an instrument which can be used for viewing, measuring or testing purposes and which is designated generally by the numeral 10. This instrument 10 is mounted upon an adjustable base designated generally by the numeral 20 and shown in FIG. 1 in the form of an upstanding parallelepiped having a relatively short height. It will be readily appreciated at the outset, however, that the adjustable base in accordance with the present invention might be of other suitable geometric configuration as might be dictated, for example, by particular needs. The instrument 10 consists of a case or cabinet 11 having a meter face or viewing screen 12 upon which certain desired information is made visible for observation. The lower portion of the cabinet 11 can be pivotally mounted on the adjustable base 20 by any conventional means.

As can be readily understood by one who has had some laboratory experience measuring, testing, or viewing instruments, space requirements and/or the location of various pieces of equipment often make it necessary to place other pieces of testing equipment on available shelf or work table space. This available space may not be particularly desirable from an observational point of view, and will create particular problems when the particular piece of test equipment is that which is to measure a value or observe a phenomenon occurring in the other pieces of equipment such as, for example, an oscilloscope to measure wave patterns or an electrical meter to measure voltage or amperage. To solve this problem in a simple and inexpensive manner, the present invention provides the study, adjustable instrument base 20 having a lower part 21 and upper part 22 with a common interface which defines an oblique plane P traversing the base mediate of the horizontal base end faces. The upper base part 22 is rotatable with respect to lower base part 21 by pivot means 23 (shown in FIG. 2) offset from the center of the oblique plane P and providing an axis of rotation perpendicular thereto. For example, the pivot 23 can be set at a distance D (FIG. 2) from the front face of the base which constitutes about 4/5 ths of the base length. The instrument case 11 can also be made rotatable with respect to upper part 22 about an axis 24 perpendicular to the upper surface of upper base part 22. The adjustable instrument base in accordance with the present invention has several distinct advantages. Firstly, the base of the present invention is sturdy though compact. Secondly, the adjustable instrument base described herein occupies a relatively small area so that it can be used in places where space is at a premium. The base is so dimensioned with respect to the instrument case that regardless of adjustment a vertical projection through the center of gravity of the instrument will remain well within the lower base part 21.

Figure 2:
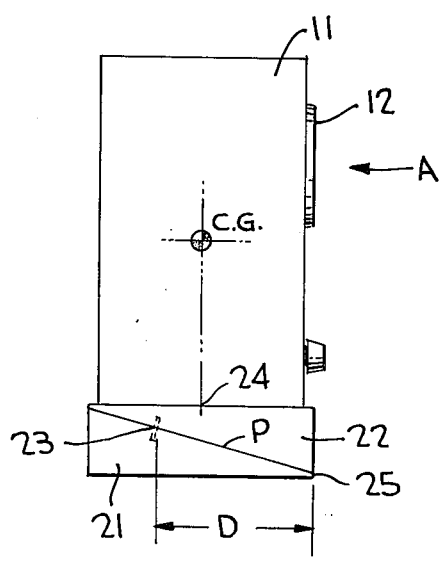
FIG. 2 is a schematic elevation view of the adjustable instrument base and instrument shown in FIG. 1.
Figure 3:
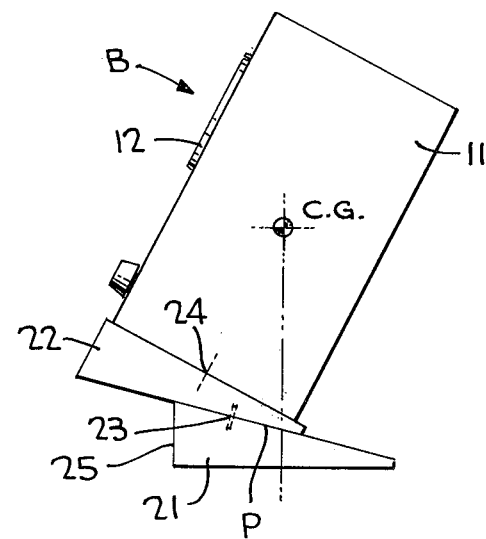
FIG. 3 is a schematic elevation view of the adjustable instrument base of the present invention and instrument in the extreme position available when the observer's line-of-sight is directed downwardly toward the instrument face.
Figure 4:
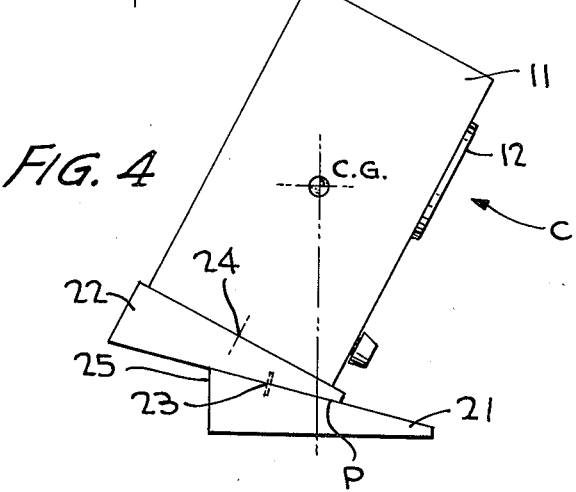
FIG. 4 is a schematic elevation view of the adjustable instrument base and instrument in the extreme position available when the observer's line-of-sight is directed upwardly toward the instrument face.

With reference now to FIGS. 2 through 4, the operation of the present invention will now be explained. Under normal and properly designed conditions, work benches or the like as well as the measuring testing, or viewing instruments themselves will be so proportioned so the viewing of the instrument face can take place without having to make any special provisions or adjustments. Such a condition is shown in FIGS. 1 and 2 wherein the instrument face 12 is used to read directly along a horizontal line-of-sight designated by the arrow A. Therefore, the upper part 22 is arranged on the lower part 21 such that the composite adjustable base 20 has in the embodiment shown a parallelepiped configuration of short height. It must also be recognized that a vertical projection of the center of gravity of the instrument case 11 in this position will fall well within the vertical projection of the area defined by the periphery 25 of the part 21 so as to provide maximum stability. Under less-than-ideal circumstances, however, the user of testing or measuring equipment will find that the instrument face 12 will not be in the optimum viewing position for making accurate measurements. This condition results when the instrument is placed for example on a bench or shelf which is above or below the observer's line-of-sight. Unless some correction is made under these circumstances, the making of an accurate measurement becomes more doubtful.

In the case where it is necessary to place the instrument on a support which is below the observer's line-of-sight, i.e., the line-of-sight designated by the arrow B is downwardly directed toward the instrument face 12 as shown in FIG. 3, it is only necessary to rotate the upper base part 22 relative to the lower base part 21 about a pivot pin 23 of conventional construction. In FIG. 3, the upper base part 22 has been rotated with respect to lower base part 21 from its horizontal line-of-sight position shown in FIGS. 1 and 2 by 180° so that an observer's downwardly directed line-of-sight B will properly view the instrument face 12. Varying degrees of adjustment, however, may be made in between the position shown in FIG. 2 and that shown in FIG. 3. The upper base part 22 and the lower base part 21, at least at the portions forming the oblique plane P, can be made from available materials that provide frictional contact between the upper base part 22 and the lower base part 21 so as to maintain these parts in their adjusted position until it is desired to readjust the instrument face position. It can also be seen in FIG. 3 that a vertical projection of the center of gravity C.G. of the instrument case 11 remains well within the areas of the adjustable base defined by the periphery 25 so as to provide maximum stability for this system.

Turning now to the situation where the instrument must be placed on a high supporting member so that the viewer is below the instrument face 12, FIG. 4 shows the adjustment necessary to achieve a direct-line-of-sight designated by the arrow C to the face 12. More specifically, the upper and lower base parts 22, 21, respectively, are maintained in the position shown in FIG. 3 as described above. Then, the instrument case 11 is rotated about its axis via a conventional pivot 24 having an axis which is perpendicular to the upper surface of upper base part 22.

While I have shown and described an embodiment in accordance with the present invention, it will be readily understood that the same is susceptible to numerous changes and modifications as will be apparent to one of ordinary skill in the art.

For example the base parts 21, 22 can either be fabricated from solid pieces or, alternatively, can be made of either sheet metal or molded, hollow material. If hollow, the interior space in these base parts can serve as small storage compartments for such items as leads, fuses, etc. Of course, one face of each base part would be hinged to provide access to the compartment.

I, therefore, do not wish to be limited to the details shown and described herein, but intend to cover all such changes and modifications as are encompassed by the scope of the appended claims.

I claim:
1. An adjustable base for mounting a viewing or control instrument of a given size thereon, comprising:
   a bottom base part having upper and lower planar surfaces;
   a top base part having upper and lower planar surfaces and being disposed in operative relationship with said bottom base part;
   the upper surface of said bottom base part and the lower surface of said top base part being disposed obliquely with respect to their respective lower and upper surfaces and parallel to each other so as to render said top and bottom base parts substantially triangular or wedge-shaped in cross-section;
   adjusting means for permitting said top base part to be rotated relative to said bottom base part such that the upper surface of said top base part is obliquely disposed relative to a surface supportng said adjustable base, and for permitting an instrument disposed upon said upper surface of said top base part to be rotated relative to said top base part such that a frontal or facial portion of the instrument is obliquely disposed, either upwardly away from or downwardly toward, the surface supporting said adjustable base, dependng upon the relative rotation between the instrument and said top base part;
   said adjusting means including first pivot means having an axis disposed perpendicular to each of the upper and lower planar surfaces of said bottom and top base parts, respectively, and offset from the geometrical center of the planar area of each of said upper and lower planar surfaces of said bottom and top base parts, respectively, such that said first pivot means is disposed within the thicker half portion of said wedge-shaped bottom base part while being simultaneously disposed within the thinner half portion of said wedge-shaped top base part, and second pivot means having an axis disposed perpendicular to said upper surface of said top base part and located at the geometrical center thereof.

2. An adjustable base according to claim 1, wherein said base has a generally parallelepiped shape at a position where said bottom and top base parts are arranged for horizontal line-of-sight viewing.

3. An adjustable base according to claim 1, wheren means is provided for retaining said top base part in adjusted position with respect to said bottom base part.

4. An adjustable base according to claim 1, wherein means is provided for retaining the instrument in adjusted position with respect to said top base part.

* * * * *